3,370,042
POLY-METHYLENEPIPERIDINO POLYMERS
William H. Rieger and John H. Chapman, Indianapolis, Ind., assignors to Reilly Tar & Chemical Corporation, Indianapolis, Ind., a corporation of Indiana
No Drawing. Filed May 24, 1965, Ser. No. 458,454
9 Claims. (Cl. 260—67.5)

ABSTRACT OF THE DISCLOSURE

Poly - methylenepiperidino polymers are disclosed. These polymers are prepared by the interaction of a di-piperidyl alkane and formaldehyde. They are characterized by having recurring in their molecular make-up the moiety

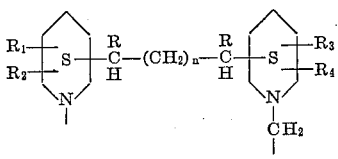

wherein R, $R_1$, $R_2$, $R_3$, and $R_4$ represent hydrogen or lower alkyl and $n$ represents an integer from 0 to 4.

---

This invention relates to a new composition of matter. More particularly, it relates to new polymethylenepiperidino polymers. The polymers of our invention are characterized by having recurring in their molecular makeup the grouping:

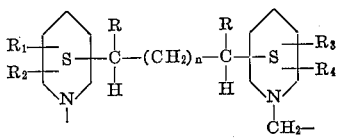

wherein R, $R_1$, $R_2$, $R_3$, and $R_4$ represent hydrogen or lower alkyl, they may be alike or they may be different; $n$ is a small integer from 0 to 4.

Our new polymers are characterized by the presence of a tertiary nitrogen in their molecular make-up. In general their softening point is above about 200° C. They are insoluble in water and in most of the common organic solvents, such for example, as acetone, methanol, cyclohexane, benzene, and the like. They are stable in neutral or alkaline media.

Our new polymers may be formed into molded articles. Their physical properties, i.e. their resistance to solvents, their stability in alkaline media, and their high softening point, make them of particular value in the plumbing and appliance industries.

In general, our new polymers may be prepared by reacting an alcoholic solution of a di-piperidyl alkane with an aqueous-alcoholic solution of formaldehyde.

The following specific examples illustrate the manner in which our invention may be carried out. These examples are given by way of illustration only and are not to be construed as a limitation of our invention.

EXAMPLE 1

*Polymer of 1,3-di-4-piperidylpropane and formaldehyde*

A solution of 105 grams of 1,3-di-4-piperidylpropane in 900 grams of methanol is placed into a beaker. This solution is stirred mechanically. While stirring the solution there is added 33 grams of a 55% formaldehyde solution in methanol-water. Almost immediately upon the addition of the formaldehyde solution, a white polymeric material separates from the reaction mixture. Soon the beaker contains a slurry of the precipitated polymer. The stirring is continued for about an hour after all of the formaldehyde has been added. Then the polymer is separated from the liquid in any convenient manner, such as by filtration or decantation. After thoroughly washing the polymer with water, it is dried in an oven at about 110° C.

The polymer has a melting point of about 200° C. It is insoluble in water, acetone, methanol, isopropanol, cyclohexane, benzene, and such solvents. It is stable in hot neutral and alkaline media. It is decomposed when exposed to dilute aqueous acid media.

The polymer is characterized by having recurring in its molecular make-up the moiety:

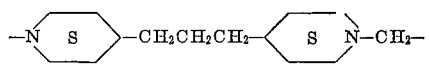

EXAMPLE 2

*Polymer of 1-(2-piperidyl)-3-(4-piperidyl) propane and formaldehyde*

The procedure of Example 1 is repeated with the exception that we use 1-(2-piperidyl)-3-(4-piperidyl)propane in place of the 1,3-di-(4-piperidyl)propane.

The polymer is characterized by having recurring in its molecular make-up the moiety:

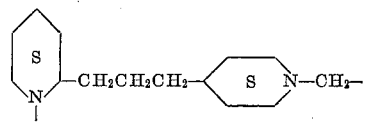

EXAMPLE 3

*Polymer of 1,3-di-2-piperidylpropane and formaldehyde*

The procedure of Example 1 is repeated with the exception that we use 1,3-di-2-piperidylpropane in place of the 1,3-di-4-piperidylpropane.

The polymer is characterized by having recurring in its molecular make-up the moiety:

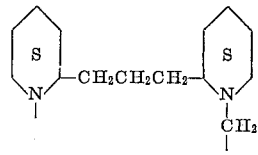

EXAMPLE 4

*Polymer of 1,4-di-4-piperidylbutane and formaldehyde*

The procedure of Example 1 is repeated with the exception that we use 1,4-di-4-piperidylbutane in place of the 1,3-di-4-piperidylpropane.

The polymer is characterized by having recurring in its molecular make-up the grouping:

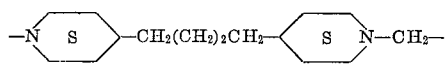

EXAMPLE 5

*Polymer of 1-[2-(5-ethyl)piperidyl]-3-4-piperidylpropane and formaldehyde*

The procedure of Example 1 is repeated with the exception that we use 1-[2-(5-ethyl)piperidyl]-3-4-piperidylpropane in place of the 1,3-di-4-piperidylpropane.

The polymer is characterized by having recurring in its molecular make-up the moiety:

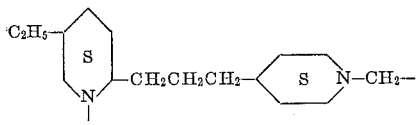

EXAMPLE 6

*Polymer of 1-(3-piperidyl)-3-(4-piperidyl) propane and formaldehyde*

The procedure of Example 1 is repeated with the exception that we use 1-(3-piperidyl)-3-(4-piperidyl)propane in place of the 1,3-di-4-piperidylpropane.

The polymer has recurring in its molecular make-up the moiety:

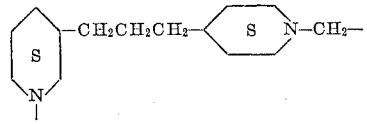

We claim as our invention:

1. Polymethylenepiperidino polymers consisting essentially of the recurring unit

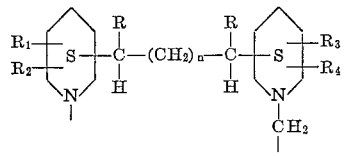

wherein R, $R_1$, $R_2$, $R_3$, and $R_4$ represent a member of the class consisting of hydrogen and lower alkyl; $n$ represents a small integer from 0 to 4.

2. A polymethylenepiperidino polymer consisting essentially of the recurring unit

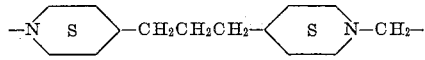

3. A polymethylenepiperidino polymer consisting essentially of the recurring unit

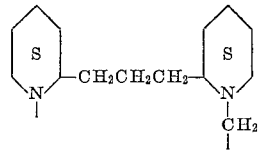

4. A polymethylenepiperidino polymer consisting essentially of the recurring unit

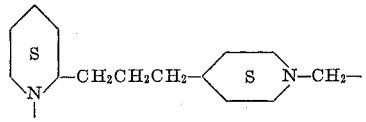

5. A polymethylenepiperidino polymer consisting essentially of the recurring unit

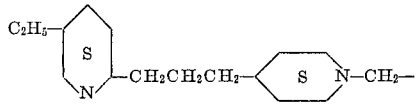

6. The process of producing the polymers consisting essentially of the recurring unit

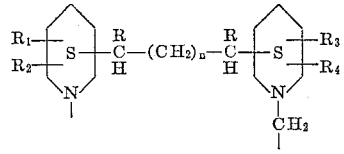

wherein R, $R_1$, $R_2$, $R_3$, $R_4$, and $n$ have the meaning as hereinafter given which comprises reacting a di-piperidyl alkane of the formula

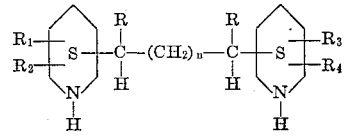

wherein R, $R_1$, $R_2$, $R_3$, and $R_4$ represent a member of the class consisting of hydrogen and lower alkyl, and $n$ is a small integer from 0 to 4, with formaldehyde.

7. The process of preparing the polymer of claim 2 which comprises reacting 1,3-di-4-piperidylpropane with formaldehyde.

8. The process of preparing the polymer of claim 3 which comprises reacting 1,3-di-2-piperidylpropane with formaldehyde.

9. The process of preparing the polymer of claim 4 which comprises reacting 1-(2-piperidyl)-3-(4-piperidyl) propane with formaldehyde.

References Cited

UNITED STATES PATENTS 2,624,736   1/1953   Goldberg et al. _____ 260—293

WILLIAM H. SHORT, *Primary Examiner.*

E. M. WOODBERRY, *Assistant Examiner.*